(12) United States Patent  
Underhill (10) Patent No.: US 6,488,100 B2
(45) Date of Patent: Dec. 3, 2002

(54) FLUFF ROLL FOR AERATION CORE PROCESSING MACHINE

(76) Inventor: Kenneth R. Underhill, 219 Miller St., Strasburg, PA (US) 17579

( * ) Notice: Subject to any disclaimer, the term of this patent is extended or adjusted under 35 U.S.C. 154(b) by 0 days.

(21) Appl. No.: 10/037,888

(22) Filed: Nov. 9, 2001

(65) Prior Publication Data

US 2002/0056555 A1 May 16, 2002

Related U.S. Application Data

(63) Continuation of application No. 09/466,743, filed on Dec. 17, 1999, now Pat. No. 6,321,849.

(51) Int. Cl.[7] .......................... B65G 67/02; A01B 45/02
(52) U.S. Cl. ............................. 172/22; 172/32; 172/33; 198/311; 198/317; 198/510.1; 198/52; 414/501
(58) Field of Search ............................. 172/21, 22, 33, 172/32; 56/16.4, 16.5, 16.6, 228; 198/312, 311, 317, 520, 510.1; 414/501, 486, 487

(56) References Cited

U.S. PATENT DOCUMENTS

| | | | | |
|---|---|---|---|---|
| 2,243,650 A | * | 5/1941 | Poll | 172/33 |
| 5,002,453 A | * | 3/1991 | Shigehisa | 414/502 |
| 5,069,293 A | * | 12/1991 | St. Romain | 172/22 |
| 5,178,221 A | * | 1/1993 | Hamawaki et al. | 172/22 |
| 5,423,386 A | * | 6/1995 | Lapearous | 172/22 |
| 5,816,336 A | * | 10/1998 | Underhill | 172/22 |

* cited by examiner

Primary Examiner—Christopher J. Novosad
(74) Attorney, Agent, or Firm—Miller Law Group, PLLC (57) ABSTRACT

A core destroying machine utilizes a single processing rotor cooperable with an arcuate screen member to disintegrate aeration cores therebetween. The arcuate screen member is configured to discharge thatch from the single processing rotor in a generally vertical direction into engagement with a rotating fluff roll. The fluff roll is configured with a pair of opposing rigid bats affixed to a central shaft for rotation around an axis of rotation. A plurality of extruded flexible plastic cords extend from the rigid bats into the direction of rotation of the fluff roll to engage the thatch portions discharged from the processing rotor and urge the thatch portions rearwardly into a collection hopper. The flexible plastic cords yield to any earthen pieces of aeration cores that might be discharged from the processing rotor to permit the discharged earthen pieces to be recycled back toward the processing rotor. The processing rotor can be driven in opposing directions to enable the core destroying machine to be operated in a core collection mode. The fluff roll is operable to direct the intact aeration cores passing over the top of the processing rotor rearwardly into the collection hopper.

20 Claims, 5 Drawing Sheets

FLUFF ROLL FOR AERATION CORE PROCESSING MACHINE

CROSS-REFERENCE TO RELATED APPLICATIONS

This application is a continuation-in-part of A.D.A. U.S. patent application Ser. No. 09/466,743, filed on Dec. 17, 1999, granted as U.S. Pat. No. 6,321,849 on Nov. 27, 2001, the contents of which are incorporated herein by reference.

BACKGROUND OF THE INVENTION

This invention relates generally to a machine for receiving green or dry cores from a turf aeration machine that removes plugs or cores of earth from the ground, such as is done on golf courses to enhance the growth of the grasses, and removing the earth from the vegetation thatch. This invention relates more specifically to an apparatus that utilizes a rotating scrubbing action to reduce the cores to the vegetation thatch and return the earth to the ground, while collecting the remaining vegetation thatch.

Aeration machines are well known in the art. These machine drive a hollow tine into the ground to create a plug of earth that is lifted above the surface of the ground and deposited on the surface. Generally, green cores, i.e. cores of earth freshly elevated from the moist ground, have to be dried for 2 to 4 hours, depending on the weather conditions, before the earthen portion can be removed from the vegetation thatch on top of the plug and the associated root system. It is preferable to return the earthen portion of the cores to the ground; however, the organic matter needs to be removed from the aerated site. Alternatively, the cores can be removed from the aerated site and taken to a remote location for subsequent handling.

While the task of aerating is a highly labor intensive job, the cost of clean-up after aeration is as great as aeration itself. Known core processing machines, such as found in U.S. Pat. No. 1,368,113 and in U.S. Pat. No. 3,410,350, suffer from a substantial problem of plugging, particularly if the cores are not adequately dried before collecting and processing. If the cores are not dried adequately, the moist earthen portion from the cores plug the core processing machines. Under some conditions, the cores can be dried too much and the earth cannot be broken-up properly for satisfactory disposal thereof.

Using golf courses as an exemplary environment typically utilizing aeration to improve the quality of the turf on which the players play, it is undesirable to hinder play for the aeration process. Golf courses and their members do not want their pastime interrupted by maintenance crews and, as a result, the aeration is intentionally done in as short a time as possible. The cores can be picked-up and removed from the ground and taken to a remote location, but this process is very labor intensive and requires the transportation of the green cores from the course. Even cores temporarily left on the ground immediately following the aeration process can be run over by the aeration machine on its next pass, creating problems with a clean pick-up of the cores. Preferably, the cores are not left on the ground for an indeterminate period, even in areas not highly frequented, as mowing becomes complicated due to the cores plugging the mowers and prematurely dulling mower blades.

Current core destroying technology involves the utilization of a machine commonly referred to as a "verti-cutter". This machine is provided with a series of vertically oriented blades that are passed over the surface of the ground to slice cores into finer particles. If the cores are still wet, also know as being "green", the verti-cutter can become plugged or wrapped with the vegetation thatch, associated root system and moist earth that is separated from the rest of the core and carried around the vertical blades.

Other known core destroying machines use a cylindrical rotating screen to separate the earth from the organic matter. Such machines require extensive screening area and become quite cumbersome in both handling and operation. Furthermore, the longitudinally extending rotary screen requires a consolidation of the swath of cores into a transversely smaller area, resulting in a dense collection of cores to be destroyed and a concentrated distribution of earth discharged back to the ground. Also, machines using a rotary screen are difficult to couple to an aeration machine so as to receive green cores directly therefrom.

A rotary aeration core processing machine, such as depicted and described in U.S. Pat. No. 6,142,239, entitled "Core Guide Apparatus for Aeration Core Harvesting Machine" and granted to Kenneth R. Underhill on Nov. 7, 2000, can be configured with a single processing rotor or paddle assembly, which will provide an adequate destruction of the aeration cores, or alternatively pass the aeration cores over the top of the paddle assembly to be collected in a hopper positioned rearwardly of the processing rotor. To provide sufficient screen contact with the single processing rotor, the thatch portion of the aeration cores remaining after the earthen portion has been disintegrated and passed through the holes in the screen, was found to be too light to move rearwardly into the collection hopper. Accordingly, it would be desirable to provide an apparatus to cause the thatch portion to move rearwardly after being discharged from the single processing rotor, without interfering with the collection of the intact aeration cores when passing over top of the single processing rotor when placed into a core collection mode of operation.

SUMMARY OF THE INVENTION

It is an object of this invention to provide a core destroying machine operable to disintegrate wet or dry aeration cores with a single processing rotor while effecting a rearward transfer of the thatch portion after being discharged from the single processing rotor.

It is another object of this invention to provide a rotatable fluff roll positioned above the single processing rotor to engage thatch discharged from the single processing rotor and cause the thatch to move rearwardly into a collection hopper.

It is an advantage of this invention that the organic thatch material of the aeration cores is swept rearwardly by the fluff roll into a collection vessel.

It is still another object of this invention to provide a fluff roll construction that will not interfere with the passage of aeration cores into the collection hopper when the machine is being operated in a core collection mode.

It is a feature of this invention that the fluff roll is formed with extruded flexible plastic cords that are operable to engage pieces of thatch to propel them rearwardly into the collection hopper.

It is another advantage of this invention that the extruded flexible plastic cords will yield to any earthen pieces of aeration cores discharged from the single processing roll to allow the earthen pieces to be re-cycled back to the processing rotor.

It is yet another object of this invention to provide a core destroying machine that is operable to destroy green aeration cores while utilizing a single rotary processing rotor.

It is still another feature of this invention that the paddle members of the processing rotor are formed as a rigid panel attached to a central rotor shaft for rotation therewith.

It is a yet another advantage of this invention that the paddle members are mounted to cooperate with screen mounted fins to help disintegrate aeration cores received from the core collection mechanism.

It is a further advantage of this invention that the operation of the core destroying machine is simple and efficient to enhance the effectiveness of the core destroying machine.

It is still a further feature of this machine that the comb member is also cooperable with the brush core pick-up mechanism to prevent the cores from being recirculated with the brush mechanism, thereby moving the aeration cores into engagement with the paddle members of the processing rotor.

It is still another feature of this invention that the core destroying machine reduces labor, minimizes compaction on the ground, enhances thatch decomposition, destroys both wet or dry cores, and provides flexibility for use at night as well as during the daylight hours.

It is still a further advantage of this invention that labor costs are reduced because of the reduced need for handling the wet aeration cores discharged from the aerator and because the aeration cores are handled faster.

It is yet a further advantage of this invention that the combined operation of an aerator and an attached core destroyer results in less traffic over the ground and, therefore, less compaction of the aerated ground surface.

It is still another object of this invention to provide a drive mechanism for a core destroying machine that is operable to convert the machine into a core collecting machine that merely collects the cores in a receptacle instead of destroying them.

It is yet a further feature of this invention that the single core destroying machine can be used selectively as a core destroying and a core collecting machine.

It is yet a further advantage of this machine that the drive mechanism can be changed to convert the machine between core destroying and core collecting modes by simply re-orienting a drive belt entrained around drive members for the rotary beaters.

It is still another feature of this invention that the fluff roll is driven in the same rotation direction whether the machine is in a core destroying mode of operation or a core collecting mode of operation.

It is yet another object of this invention to provide a core destroying machine that is operable to disintegrate wet or dry aeration cores and which is durable in construction, inexpensive of manufacture, carefree of maintenance, facile in assemblage, and simple and effective in use.

These and other objects, features and advantages are accomplished according to the instant invention by providing a core destroying machine utilizing a single processing rotor cooperable with an arcuate screen member to disintegrate aeration cores therebetween. The arcuate screen member is configured to discharge thatch from the single processing rotor in a generally vertical direction into engagement with a rotating fluff roll. The fluff roll is configured with a pair of opposing rigid bats affixed to a central shaft for rotation around an axis of rotation. A plurality of extruded flexible plastic cords extend from the rigid bats into the direction of rotation of the fluff roll to engage the thatch portions discharged from the processing rotor and urge the thatch portions rearwardly into a collection hopper. The flexible plastic cords yield to any earthen pieces of aeration cores that might be discharged from the processing rotor to permit the discharged earthen pieces to be re-cycled back toward the processing rotor. The processing rotor can be driven in opposing directions to enable the core destroying machine to be operated in a core collection mode. The fluff roll is operable to direct the intact aeration cores passing over the top of the processing rotor rearwardly into the collection hopper.

BRIEF DESCRIPTION OF THE DRAWINGS

The inventions disclosed herein will be best understood with reference to the attached drawings, including.

DESCRIPTION OF THE PREFERRED EMBODIMENT

Figure 1:
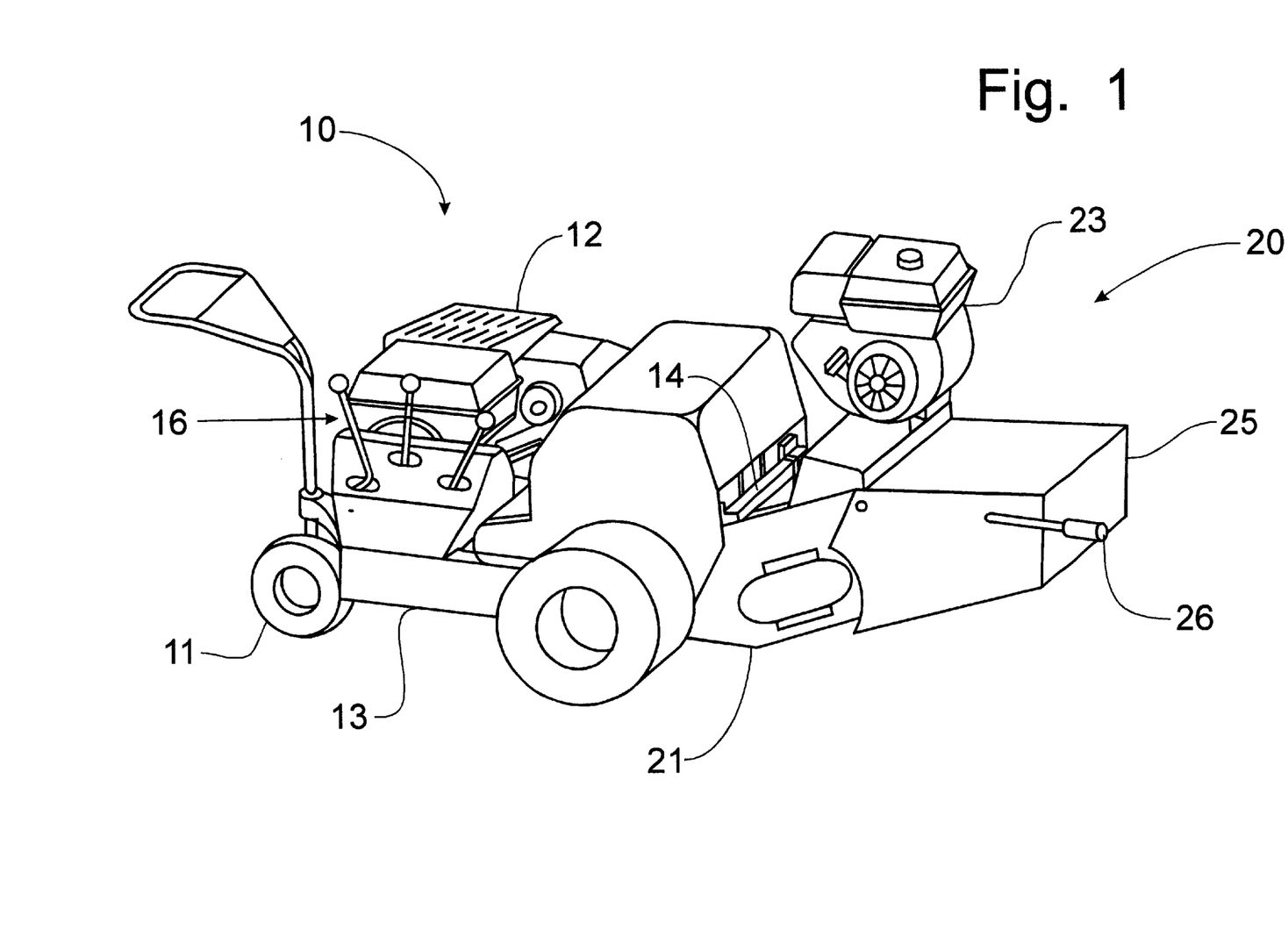
FIG. 1 is a left side perspective view of a core processing machine incorporating the principles of the instant invention shown attached to a conventional aeration machine, the core processing machine being in a core destroying mode of operation.

Referring first to FIG. 1, an overall perspective view of the core processing machine incorporating the principles of the instant invention can best be seen. The core processing machine 20 is shown attached to a conventional, representative aeration machine 10, shown as a walk-along model having a steerable front wheel 11 and an engine 12 providing a source of operative power for the operation of the aeration machine 10. The aeration machine 10 is also provided with a self contained hydraulic system having controls 16 that are operable, among other things, to raise the aeration mechanism 15 into an inoperative position via a pivotal movement of the aeration mechanism 15 relative to the base frame 13 of the aeration machine 10. One skilled in the art will recognize that the aeration machine 10 can be manufactured in a number of different configurations; however, all such known configurations involve the operation of an aeration mechanism that removes aeration cores from the ground and discharges the cores rearwardly from the machine 10. Any left and right references are used as a matter of convenience and are determined by standing at the rear of the core processing machine adjacent the thatch receptacle and facing the forward end, the direction of travel.

The core processing machine 20 can be designed to mount directly to the rear portion of the aeration machine 10 to receive the aeration cores straight from the aeration mechanism 15. Alternatively, the core processing machine can be trailed behind the aeration machine 10 or even operated independently of the aeration machine 10 to pick-up aeration cores from the ground. While the core processing machine 20 can be provided with a pair of laterally spaced ground wheels (not shown), the weight of the core processing machine 20 has been reduced from that previously known in the art to enable the core processing machine 20 to be supported completely from the frame of the aerator 10. The core processing machine 20 is also provided with its own engine 23 to provide a source of operative power for the operation of the core processing machine 20 independently of the aeration machine 10. The core processing machine 20 is equipped with its own power source because of the variety of manufacturers of aeration machines 10 and the resultant different drive configurations for the aeration machines 10. The instant invention is intended to be operable with all aeration machines 10 irrespective of the manufacturer.

Figure 2:
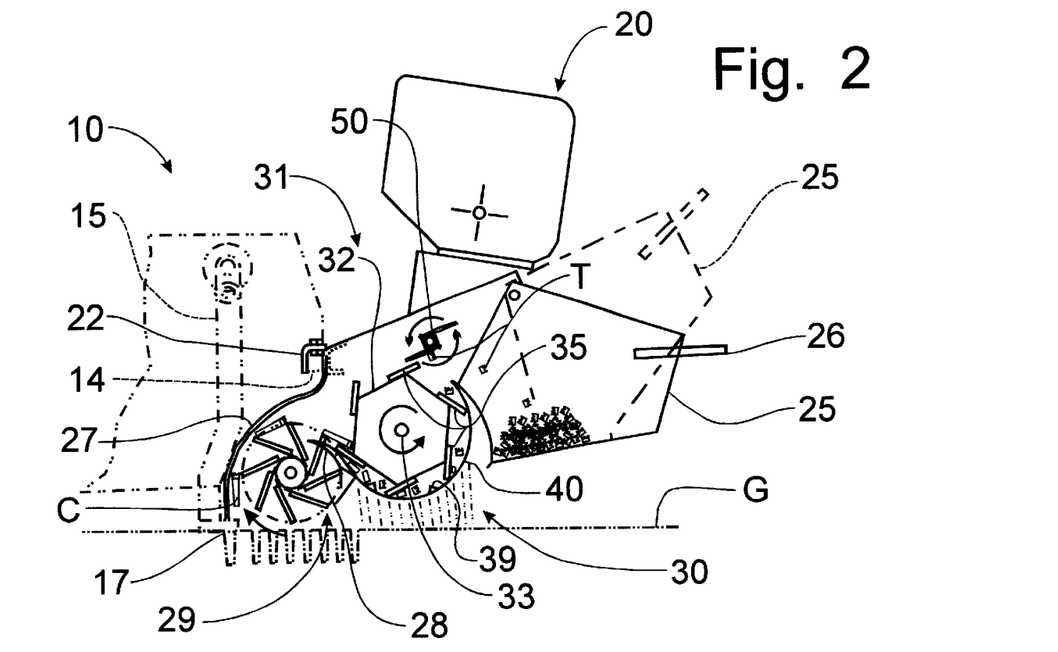
FIG. 2 is a schematic cross-sectional representation of the core processing machine shown in FIG. 1 in the core destroying mode of operation.
Figure 3:
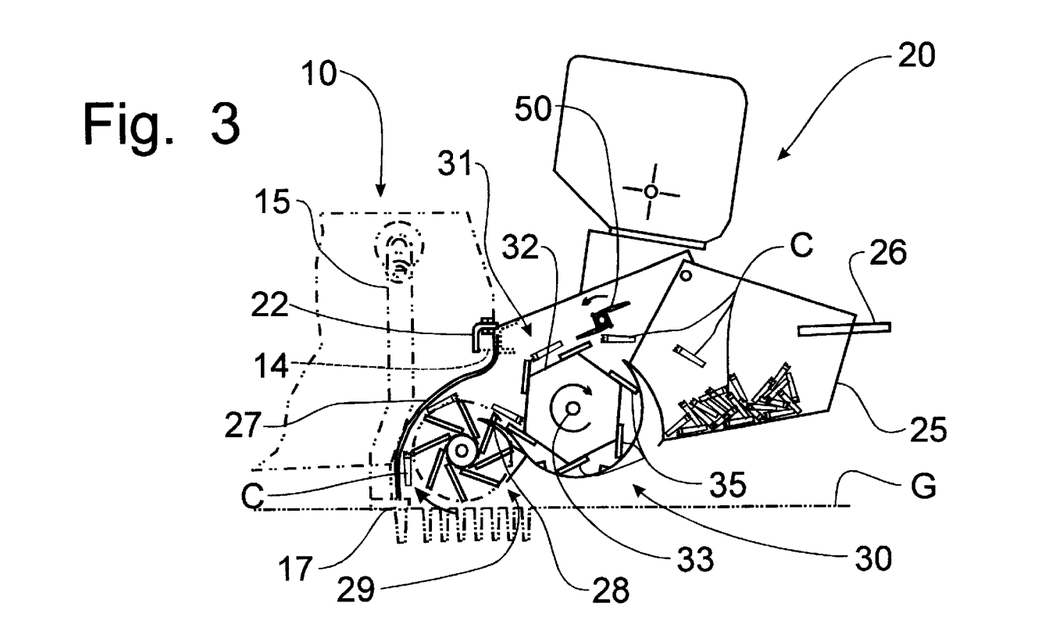
FIG. 3 is a schematic cross-sectional representation of the core processing machine operating in the core collecting mode of operation.
Figure 4:
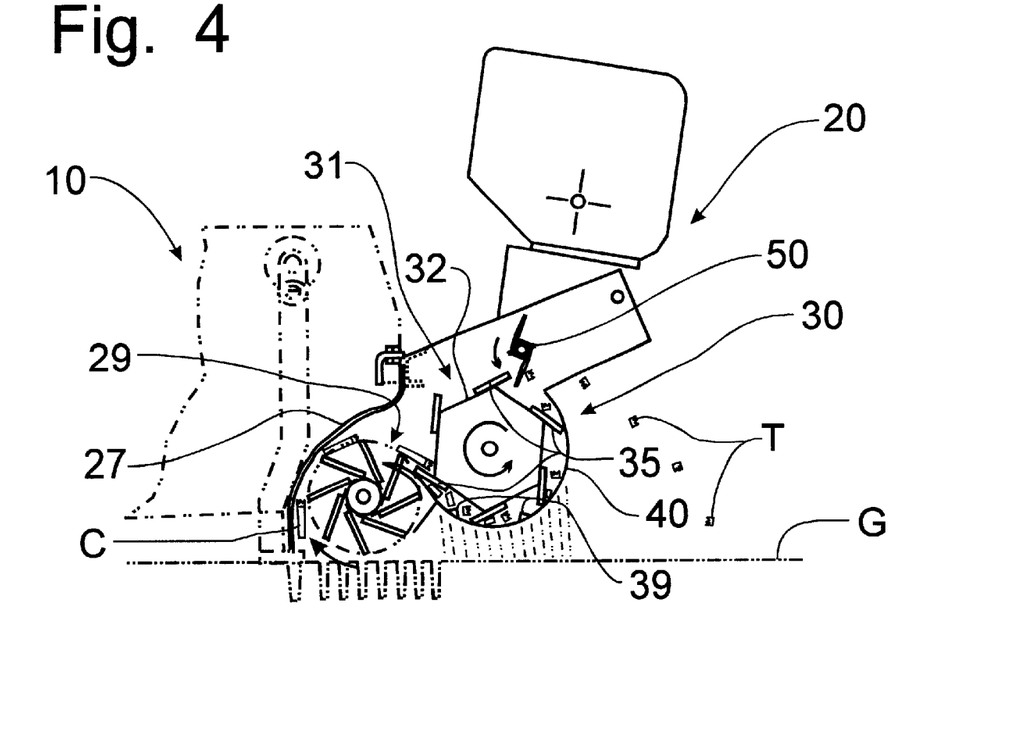
FIG. 4 is a schematic cross-sectional representation of the core processing machine operating without a collection hopper so that material such as thatch or intact cores will be discharged directly to the ground.

The core processing machine 20 is operable in two different modes of operation: the core destroying mode shown in FIGS. 2 and 4 and the core collecting mode shown in FIG. 3. In the core destroying mode, the core processing machine 20 is operable to remove the earthen portion of the aeration cores C from the thatch portion T, returning the earthen portion to the ground G and typically collecting the thatch portion T in the optional thatch receptacle 25, as depicted in FIG. 2. In some instances, the operator might desire to simply discharge the thatch portion directly to the ground, as shown in FIG. 4. The disintegrated earthen portion of the aeration cores is returned to the ground G in a finely scattered layer which can be swept into the aeration holes remaining in the ground G by a separate sweeping mechanism (not shown). The thatch portions T can be dumped at a remote location, if collected as depicted in FIG. 2, without returning them to the ground where the aeration is being undertaken. Even in the core collecting mode, the aeration cores can be collected or discharged directly to the ground, under which circumstances the aeration cores are sufficiently broken-up that the earthen portions can still be swept back into the aeration holes.

The thatch receptacle 25 is pivotally mounted on the frame 21 of the core processing machine for movement between a collecting position shown in solid lines in FIGS. 2 and 3, and a dumping position depicted in phantom in FIG. 2. The thatch receptacle 25 is provided with a handle 26 to permit the operator to pivotally move the receptacle 25 between the two positions as desired. Optional powered pivoting mechanisms, such as a hydraulic cylinder or electric actuator (not shown), could also be provided to facilitate the selective discharge of the collected thatch portions.

The core processing machine 20 can be coupled to the aeration machine 10, for example as depicted in FIGS. 2–4, by fastening the cross frame member 22 of the core processing machine 20 to a corresponding cross frame member 14 of the aeration machine 10, such as by bolting or clamping the two members 14, 22 together. Alternatively, the core processing machine 20 could be detachably connected to the aeration machine by a draft member (not shown) to position the core processing machine rearwardly of the aeration machine 10 so that the aeration machine 10 can discharged aeration cores to the ground where the collection brush 29 or other pick-up mechanism would retrieve the aeration cores for processing. It is desirable that the core processing machine 20 be raised to an inoperative position (not shown) when the aeration machine 10 is placed in such an orientation as is known in the art.

A flexible core guide 27, preferably constructed from a tough yet generally flexible material such as tire carcass, is bolted to the harvester cross frame member 22 and also to the forward portion of the tines 17. Since the tines 17 move in a generally elliptical path during operation of the aeration machine 10, the connection of the flexible core guide 27 to the forward portion of the tines 17 allows the core guide 27 to follow the tines 17 throughout the path of movement and contain the aeration cores C being ejected from the tines 17. The flexible core guide 27 is bent into a generally "S-shaped" configuration to cooperate with the collection brush 29 while limiting the path of movement of the ejected aeration cores C.

The tines 17 move through an elliptical path of movement, as is known by one skilled in the art, that projects upwardly into the collection brush 29 so that the ejected earthen cores C have no where to go except upwardly and rearwardly with the rotating collection brush 29. The flexible core guide 27 varies the gap between the guide 27 and the collection brush 29 as the tines 17 moves through the elliptical stroke because the flexible core guide 27 is physically connected to the cross frame member 22 of the core processing machine and the cross frame member 14 of the aeration machine 10 so that the rearward portion is generally fixed relative to the aeration machine 10, while the forward portion of the flexible core guide 27 is fastened to the tines 17 to be movable therewith.

Figure 5:
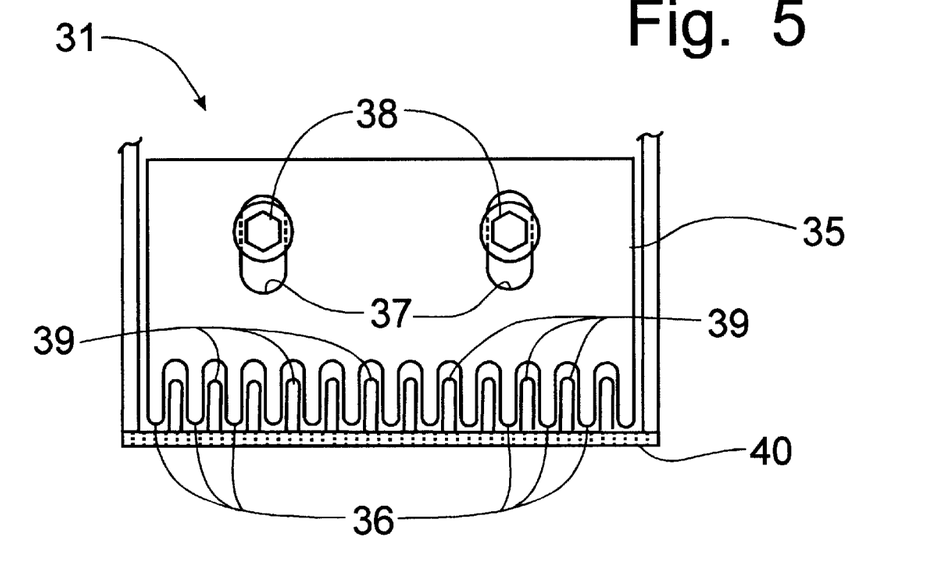
FIG. 5 is a partial diagrammatic view of a paddle member of the processing rotor passing through the openings in a comb member to start the core disintegration process.

The collection brush 29 is forwardly positioned on the core processing machine 20 to cooperate with the flexible core guide 27 and to transport the ejected aeration cores C from the tines 17 to the core destroying mechanism 30 positioned immediately rearwardly of the collection brush 29. The collection brush 29 can be constructed from steel or plastic wires that extend radially from a central core (not shown), or formed more economically as a series of transversely extending linear brushes that are fixed to a central core, as is depicted in FIGS. 2–4. The rotating collection brush 29 pulls the ejected aeration cores C from the aeration machine 10, trapping the cores C between the brush 29 and the flexible core guide 27 until discharging them into the core destroying mechanism 30. A stripper device 28 is positioned between the collection brush 29 and the processing rotor 31 to positively engage the back side of the collection brush 29 to prevent aeration cores C from being carried around the collection brush 29 and to transfer the collected cores from the brush 29 rearwardly into the processing rotor 31. The core destroying mechanism 30 is preferably formed with a single processing rotor 31 positioned immediately rearwardly of the collection brush 29 to receive the collected aeration cores C directly therefrom. The processing rotor 31 is preferably formed with a plurality of rigid metal paddle members 35 fixed to a central mounting support member 32 that is rotatable about a central axis of rotation 32=a. As best seen in FIG. 5, the paddle members 35 are formed with slotted openings 37 through which fasteners 38 pass to engage the central mounting support member 32. The slots 37 permit a radial positional adjustment of the paddle member 35 to permit the paddle member to be positioned properly with respect to the screen member 40 and core destroying fins 39 mounted on the screen member 40 and to permit the position of the paddle member 35 to be adjusted for wear. The paddle member 35 is formed with teeth 36 forming the front edge of the paddle member 35. The teeth 36 pass by the core destroying fins 39 that are aligned with the interstitial spaces between the teeth 36.

In the core destroying mode of operation, the paddle members 35 are cooperable with an arcuate concave screen member 40 positioned below the processing rotor 31. The paddles 35 are oriented to sweep against the concave screen member 40 to rub the ejected green cores against the screen and force the separation of the earthen material from the thatch portion T. The separated earthen material is forced through the holes in the screen member 40 and discharged therethrough to the surface of the ground G. To obtain as much engagement between the paddle members 35 and the screen member 40, the screen member 40 extends about 180 degrees around the circumference of the processing rotor 31 to a position in which the remaining separated thatch portion T is ejected from between the processing rotor 31 and the screen member 40 in an upward and slightly forward direction. As a result, this particular configuration encounters a problem with respect to transferring the remaining thatch portion T from the processing rotor 31 into the collection hopper 25, which is rearward of the processing rotor 31.

Figure 8:
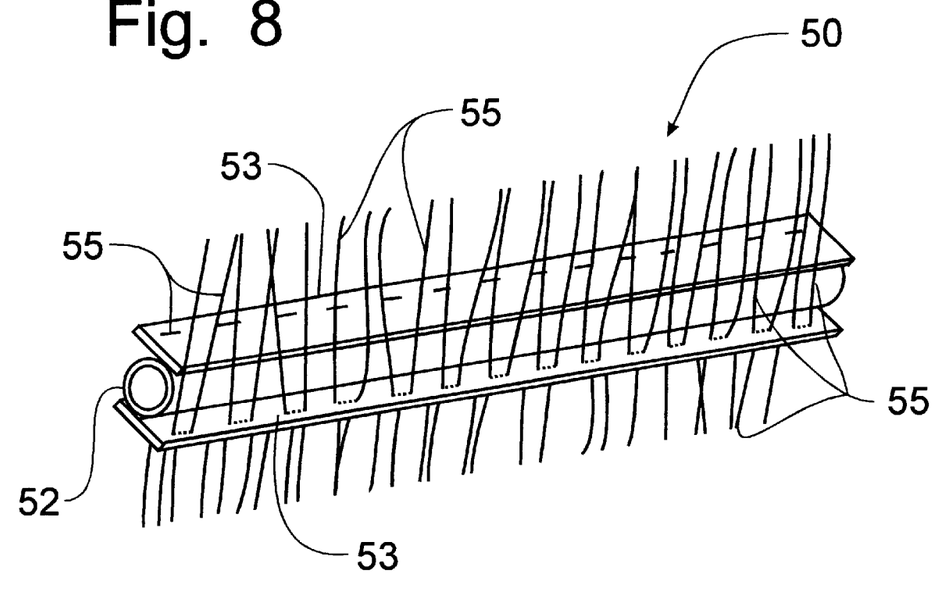
FIG. 8 is a perspective view of the fluff roll.
Figure 9:
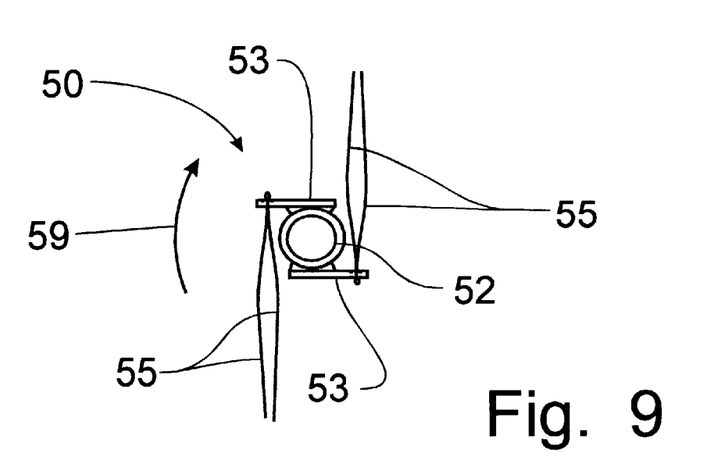
FIG. 9 is a side elevational view of the fluff roll.

To facilitate the transfer of the separated thatch portion T into the collection hopper 25, a fluff roll 50 is rotatably mounted above the processing rotor 31 to engage the thatch portion T discharged from the processing rotor 31 and change the trajectory of the thatch portion T into a rearward direction to convey the thatch portion T into the collection hopper 25. The details of the fluff roll are best seen in FIGS. 8 and 9. The fluff roll 50 is formed with a pair of opposing rigid bats 53 fixed tangentially to a central rotatable shaft member 52. The bats 53 have a plurality of extruded plastic cords 55 extending generally perpendicularly therefrom into the direction of rotation, indicated by the arrow 59. Preferably, these plastic cords pass through corresponding pairs of openings in the rigid bats 53 where the cords are hooked into the bats 53 without the need for clamping or epoxy. Accordingly, the plastic cords can be replaced if shortened by wear.

These plastic cords are stiff enough to maintain a generally perpendicular orientation to engage the light thatch portion T, yet flexible enough to yield to any heavier earthen pieces that might also be ejected from the processing rotor 31, allowing the heavier earthen pieces to be re-cycled by the direction of the discharge from the processing rotor 31 back into the processing rotor 31. The fluff roll 50 is positioned for minimal interference with earthen cores C passing over the top of the processing rotor 31 when the core destroying machine 20 is being operated in the core collecting mode of operation.

As best seen in FIG. 2, the direction of rotation of the processing rotor 31 is counterclockwise, when viewed from the left side, which operates to drive the ejected cores received from the collection brush 29 downwardly into the screen member 40 for disintegration. In the core collection mode, best seen in FIG. 3, the processing rotor 31 is rotated in the clockwise direction as viewed from the left side of the machine 20 to direct the ejected cores received from the collection brush 29 upwardly to be discharged into the collection hopper 25. While the cores C will typically be somewhat chewed up by the action of the processing rotor 31 and the fluff roll 50, depending on the soil type of the earthen material and the depth of the root zone of the thatch portion, the transportation of the cores C rearwardly over top of the beater assemblies 31 preferably effects a transportation of both the separated dirt and the thatch portion T into the thatch receptacle 25 for subsequent disposition.

Occasionally, the operator might desire to discharge the thatch T, or for that matter the intact cores C, back to the ground G. Such a configuration is depicted in FIG. 4, wherein the collection hopper 25 is simply removed from the core destroying machine 20, allowing the discharge from the processing rotor 31 to be placed on the ground G. When in the core destroying mode of operation, the thatch portion T will then be discharged on top of the disintegrated earthen portion that has been spread upon the ground in a fine layer.

Figure 6:
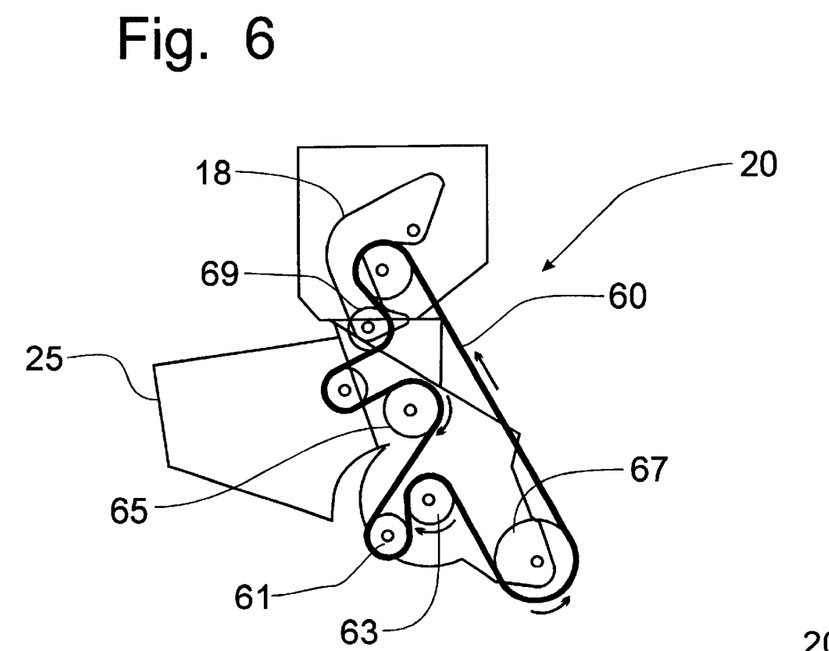
FIG. 6 is a schematic side elevational representation of the right side of the core destroying machine showing the drive belt configuration when in the core destroying mode of operation.
Figure 7:
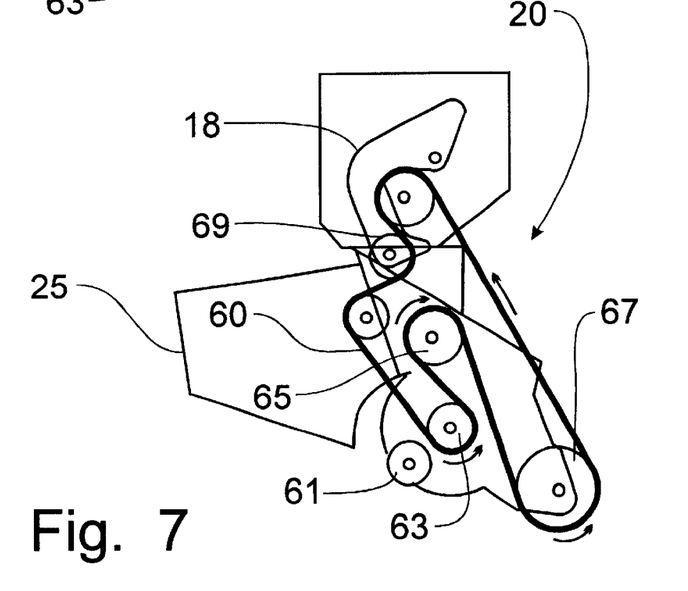
FIG. 7 is a schematic side elevational representation of the right side of the core destroying machine showing the drive belt configuration when in the core collecting mode of operation.

The drive configuration is best seen in FIGS. 6 and 7. The core destroying mode of operation is depicted in FIG. 6 which utilizes an idler pulley 61 to direct the drive belt 60 around the drive pulley 63 for the processing rotor 31 for rotation thereof in a manner to bring the collected cores between the paddle members 35 and the screen member 40 for disintegration of the cores. The idler pulley 61 is not utilized with the drive belt 60 when configured in the core collecting mode of operation, depicted in FIG. 7. Instead, the drive belt 60 wraps around the drive pulley 63 for the processing rotor 31 to rotate the rotor 31 in a manner to direct the collected cores over top of the rotor 31 toward the rearward collection hopper 25.

In both modes of operation, the drive pulley 65 for the fluff roll is driven in the same direction, as is reflected in FIGS. 2–4, to assist in directing the path of the thatch or intact cores, respectively, toward the collection hopper 25. Likewise, the drive pulley 67 for the collection brush 29 is driven in the same direction in both modes of operation to convey the earthen cores rearwardly to the processing rotor 31. The drive can be de-clutched by movement of the pivoted arm 18 carrying the tensioning idler 69 that is selectively movable into engagement with the drive belt 60. The details of the drive mechanism are best described in co-pending U.S. patent application Ser. No. 09/466,743, which is incorporated herein by reference. Conversion of the core processing machine 20 from the core destroying mode into the core collection mode of operation involves a re-configuration of the drive belt 60. By taking the tension off of the drive belt 60, the operator can reconfigure the drive path of the drive belt in either configuration shown in FIGS. 6 and 7.

In operation, the aeration machine 10 extracts green aeration cores from the ground G to aerate the soil by plunging hollow tines 17 into the ground to remove the cores in a conventional manner. After the first stroke into the ground, each subsequent stroke of the tine 17 into the ground pushes the previous core upwardly out of the hollow tine 17 where the green core is engaged with a collection brush 29 that guides the green core along a flexible core guide 27 rearwardly into a core destroying mechanism 30. The flexible core guide 27, attached to the front of the tines 17 to follow the elliptical path of the movement of the tines 17 during its operation, keeps the ejected cores engaged with the collection brush 29 to be conveyed rearwardly for further treatment.

When in the normal core destroying mode of operation, the processing rotor 31 brings the collected earthen cores C between the paddle members 35 and the arcuate concave screen member 40 in order to separate the earthen material from the thatch portion T of the earthen core C. To facilitate the destruction of the cores C, the paddles 35 drive the cores C over the core destroying fins 39 located at the front of the screen member 40. The gaps between the teeth 36 of the paddles 35 are aligned with the core destroying fins 39.

After the cores C have passed through the processing rotor 31, the earthen portion of the cores has been disintegrated into a fine residue that is discharged downwardly through the screen member 40 to be deposited on the ground immediately beneath the core processing machine 20. After the core processing machine 20 has passed over a section of ground a ground sweeper can be utilized to sweep the discharged residue into the aeration holes created by the removal of the cores by the aeration machine 10. The root thatch portions T are too large to pass through the openings in the screen members 35 and are finally discharged upwardly toward the fluff roll 50 which intercepts the thatch portions T and re-directs the trajectory into the rearwardly disposed thatch collection receptacle 25. The collected thatch portions T can be removed to a selected appropriate remote site and dumped from the thatch receptacle 25 by pivoting the receptacle 25 about its pivotal connection with the frame 21 via a manipulation of the dumping handle 26.

The drive mechanism 40 can also be alternatively configured to effect rotation of the processing rotor 31 in the opposite direction to that of the core destroying mode to create a core collection mode of operation. In this core collection mode of operation, the intent is to collect the entire green core in the thatch collection receptacle 25 until they can be appropriately disposed at a remote location. By re-configuring the drive belt 60 into a configuration that rotates the processing rotor 31 to elevate the ejected cores conveyed rearwardly by the collection brush 29, the cores can be conveyed rearwardly over top of the processing rotor 31 and directed by the fluff roll 50 for discharge into the thatch receptacle 25. After a sufficient number of cores have been collected, the receptacle 25 can be pivoted to dump the collected cores into a remote location. As one skilled in the art will readily recognize, the instant invention embodied in the core processing machine 20 described above can selectively be used to either destroy green cores received directly from an aeration machine 10 or to collect the cores C for subsequent disposal.

The core processing machine 20 is designed to be attached to the rear of the aeration mechanism 15 of the aeration machine 10, preferably by attaching the cross frame member 22 of the core processing machine 20 to a corresponding cross frame member 14 of the aeration machine 10, so as to be movable therewith. It is the intention of the instant invention to permit the core processing machine 20 to be mounted on any aeration machine 10 irrespective of the manufacturer of the machine 10 or the specific configuration thereof. By mounting the core destroying machine 20 on ground engaging and support wheels (not shown), the core destroying machine 20 can be independently operated. The collection brush 29, or other appropriate device, can be used to pick up earthen cores that have been deposited on the surface of the ground G. The collection brush 29 is capable of lightly sweeping across the surface of the ground to pick-up the earthen cores and convey them rearwardly in either the core destroying mode or the core collection mode, as described in detail above. One skilled in the art will readily realize that the forward portion of the core processing machine 20 could be formed as a floating header, such as is taught in U.S. Pat. No. 5,816,336, granted to Kenneth R. Underhill on Oct. 6, 1998, so that the collection brush could follow changing ground undulations to effectively collect the earthen cores from the surface of the ground.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An aeration core processing machine comprising:
   a frame adapted for movement over the ground in a direction of travel;
   a core collection device forwardly positioned on said frame to collect earthen aeration cores;
   a processing rotor oriented transversely to said direction of travel and being rotatable about a first transverse axis of rotation, said processing rotor receiving said earthen aeration cores from said core collection device;
   an arcuate screen member circumferentially positioned adjacent said processing rotor to be cooperable therewith to effect a disintegration of said earthen cores therebetween; and
   a drive mechanism connected to said processing rotor to power the rotation thereof in a first direction to convey said earthen aeration cores received from said core collection device between said processing rotor and said screen member.

2. The aeration core processing machine of claim 1 wherein said arcuate screen member is positioned beneath said processing rotor and extends only partially around said processing rotor, said arcuate screen member having holes therein for the passage of disintegrated earthen core material through said screen member.

3. The aeration core processing machine of claim 2 wherein said arcuate screen member is oriented to direct any discharged material being discharged from between said processing rotor and said arcuate screen member in an upwardly direction, said aeration core processing machine further comprising:
   a rotatable device positioned above said processing rotor to intercept any said discharged material.

4. The aeration core processing machine of claim 3 wherein said rotatable device comprises:
   a support apparatus mounted for rotation about a second axis of rotation oriented generally parallel to said first axis of rotation; and
   a plurality of flexible members mounted on said support apparatus and projecting outwardly therefrom.

5. The aeration core processing machine of claim 4 wherein said flexible members are elongated plastic cords which are operable to direct a thatch portion of said earthen aeration cores rearwardly of said processing rotor, said plastic cords allowing the passage of earthen material therethrough to permit said earthen material to be re-cycled back to said processing rotor for further disintegration thereof.

6. The aeration core processing machine of claim 5 wherein said drive mechanism can be configured in a core destroying mode of operation in which said processing rotor is rotated in said first direction and in a core collecting mode of operation in which said processing rotor is rotated in a second direction opposite of said first direction.

7. The aeration core processing machine of claim 6 wherein said processing rotor is operable in said core collecting mode of operation to convey said earthen aeration cores received from said core collection device over the top of said processing rotor without passing said earthen aeration cores between said processing rotor and said arcuate screen member.

8. The aeration core processing machine of claim 7 wherein said processing rotor and said rotatable device are rotated in opposite directions when said drive mechanism is configured in said core collecting mode of operation.

9. The aeration core processing machine of claim 8 wherein said core collection device is a rotatable brush apparatus, said rotatable device and said brush apparatus being rotatably powered by said drive mechanism, each of said brush apparatus and said rotatable device being rotated in the same direction in both said core collecting mode of operation and said core destroying mode of operation.

10. The aeration core processing machine of claim 9 wherein said processing rotor comprises:
   a central mounting structure rotatable about said first axis of rotation; and
   a plurality of rigid paddle members detachably mounted to said central mounting structure.

11. The aeration core processing machine of claim 10 wherein each said paddle member is formed with a toothed front edge to be cooperable with core destroyer fins aligned with gaps between said paddle member teeth enhance the disintegration of said earthen aeration cores, each said paddle member further being formed with a pair of slotted openings for the passage of fasteners detachably mounting said paddle member to said central mounting structure, said slotted openings permitting positional adjustment of said paddle member relative to said core destroyer fins.

12. An aeration core processing machine comprising:
   a frame adapted for movement over the ground in a direction of travel;
   a core collection device forwardly positioned on said frame to collect earthen aeration cores;
   a processing rotor oriented transversely to said direction of travel and being rotatable about a first transverse axis of rotation, said processing rotor receiving said earthen aeration cores from said core collection device;
   an arcuate screen member circumferentially positioned beneath said processing rotor and extending partially around said processing rotor to be cooperable therewith to effect a disintegration of said earthen cores therebetween, said arcuate screen member having holes therein for the passage of disintegrated earthen core material through said screen member, said arcuate screen member being oriented to direct any discharged material being discharged from between said processing rotor and said arcuate screen member in an upwardly direction;
   a rotatable fluff roll positioned above said processing rotor to intercept any said discharged material and to re-direct the trajectory of at least a portion thereof; and
   a drive mechanism connected to said processing rotor to power the rotation thereof in a first direction to convey said earthen aeration cores received from said core collection device between said processing rotor and said screen member.

13. The aeration core processing machine of claim 12 wherein said rotatable fluff roll comprises:
   a support structure mounted for rotation about a second axis of rotation oriented generally parallel to said first axis of rotation; and
   a plurality of elongated plastic cords mounted on said support structure and projecting generally orthogonally therefrom, said plastic cords being operable to direct a thatch portion of said earthen aeration cores rearwardly of said processing rotor while allowing the passage of any earthen material discharged from between said processing rotor and said screen member through said plastic cords to be returned to said processing rotor for further disintegration thereof.

14. The aeration core processing machine of claim 13 wherein said drive mechanism can be configured in a core destroying mode of operation in which said processing rotor is rotated in said first direction and in a core collecting mode of operation in which said processing rotor is rotated in a second direction opposite of said first direction, said processing rotor being operable in said core collecting mode of operation to convey said earthen aeration cores received from said core collection device over the top of said processing rotor without passing said earthen aeration cores between said processing rotor and said arcuate screen member.

15. The aeration core processing machine of claim 14 wherein said processing rotor comprises:
   a central mounting structure rotatable about said first axis of rotation; and
   a plurality of rigid paddle members detachably mounted to said central mounting structure, each said paddle member having:
      a scalloped front edge defining teeth cooperable with core destroyer fins aligned with gaps between said paddle member teeth to enhance the disintegration of said earthen aeration cores; and
      a pair of slotted openings for the passage of fasteners detachably mounting said paddle member to said central mounting structure, said slotted openings permitting positional adjustment of said paddle member relative to said core destroyer fins.

16. The aeration core processing machine of claim 15 wherein said core collection device is a rotatable brush apparatus, said rotatable fluff roll and said brush apparatus being rotatably powered by said drive mechanism, each of said brush apparatus and said rotatable device being rotated in the same direction in both said core collecting mode of operation and said core destroying mode of operation.

17. The aeration core processing machine of claim 16 wherein said aeration core processing machine is adapted for detachable connection to an aeration machine operable to extract earthen aeration cores from the ground, said aeration core processing machine being positioned rearwardly of said aeration machine to receive said aeration cores directly therefrom.

18. An aeration core processing machine comprising:
   a frame adapted for movement over the ground in a direction of travel;
   a core collection device forwardly positioned on said frame to collect earthen aeration cores;
   a processing rotor oriented transversely to said direction of travel and being rotatable about a first transverse axis of rotation, said processing rotor receiving said earthen aeration cores from said core collection device;
   an arcuate screen member circumferentially positioned adjacent said processing rotor to be cooperable therewith to effect a disintegration of said earthen cores therebetween, said screen member having a rear discharge edge oriented to direct any material discharged from said processing rotor not passing through said screen member in a generally vertical direction;
   a rotatable device positioned above said processing rotor to intercept any said discharged material, said rotatable device being operable to direct light thatch material rearwardly while allowing heavier earthen material to be re-cycled into said processing rotor; and
   a drive mechanism connected to said processing rotor and said rotatable device to power the rotation thereof.

19. The aeration core processing machine of claim 18 wherein said rotatable device comprises:
   a support structure mounted for rotation about a second axis of rotation oriented generally parallel to said first axis of rotation; and a plurality of flexible members mounted on said support structure and projecting outwardly therefrom.

20. The aeration core processing machine of claim 19 wherein said flexible members comprise:

a plurality of elongated plastic cords mounted on said support structure and projecting generally orthogonally therefrom, said plastic cords being operable to direct a thatch portion of said earthen aeration cores rearwardly of said processing rotor while allowing the passage of any earthen material discharged from between said processing rotor and said screen member through said plastic cords to be returned to said processing rotor for further disintegration thereof.

* * * * *